United States Patent [19]
Kadin

[11] 3,888,988
[45] June 10, 1975

[54] OXOBENZOFURAN CARBOXAMIDES IN ALLEVIATING INFLAMMATION

[75] Inventor: Saul B. Kadin, New London, Conn.

[73] Assignee: Pfizer Inc., New York, N.Y.

[22] Filed: Mar. 15, 1974

[21] Appl. No.: 451,424

Related U.S. Application Data

[62] Division of Ser. No. 246,491, April 21, 1972, Pat. No. 3,829,446, which is a division of Ser. No. 81,162, Oct. 15, 1970, Pat. No. 3,676,463.

[52] U.S. Cl. .............................................. 424/279
[51] Int. Cl. ............................................ A61u 27/00
[58] Field of Search ..................................... 424/279

[56] References Cited
UNITED STATES PATENTS
2,757,178   7/1958   Hutchings et al. .............. 260/343.3

*Primary Examiner*—Stanley J. Friedman
*Attorney, Agent, or Firm*—Connolly and Hutz

[57] ABSTRACT

A series of novel 2-oxo-2,3-dihydrobenzofuran-3-carboxamides have been prepared, including their pharmaceutically acceptable salts. These compounds are useful in therapy as non-steroidal anti-inflammatory agents. Alternate methods of preparation are provided and the principal synthetic route is described in detail.

10 Claims, No Drawings

OXOBENZOFURAN CARBOXAMIDES IN ALLEVIATING INFLAMMATION

This application is a division of application Ser. No. 246,491 filed Apr. 21, 1972 now U.S. Pat. No. 3,829,446, which is a division of application Ser. No. 81,162 filed Oct. 15, 1970 and now U.S. Pat. No. 3,676,463.

BACKGROUND OF THE INVENTION

This invention relates to various new and useful 2-oxobenzofuran carboxamides in the field of medicinal chemistry. More particularly, it is concerned with a novel series of 2-oxo-2,3-dihydrobenzofuran-3-carboxamides, which are of especial value in view of their unique chemotherapeutic properties.

In the past, various attempts have been made by numerous investigators in the specialized field of synthetic organic medicinal chemistry to obtain new and useful anti-inflammatory agents. For the most part, these efforts have involved the synthesis and testing of various steroidal hormone compounds such as the corticosteroids. However, in the search for still newer and better or more improved anti-inflammatory agents, far less is known about the effect of non-steroidal agents in this era, albeit this would be attractive since they would also necessarily lack the untoward steroidal side-effects.

SUMMARY OF THE INVENTION

In accordance with the present invention, it has now been found that various novel 2-oxobenzofuran carboxamide compounds, i.e., non-steroids, are surprisingly, extremely useful when employed in the field of drug therapy as anti-inflammatory agents. More specifically, the novel compounds of this invention are 2-oxo-2,3-dihydrobenzofuran-3-carboxamides of the formula:

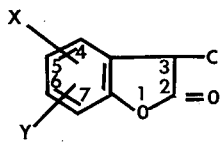

and the base salts thereof with pharmacologically acceptable cations, wherein X and Y are each a member selected from the group consisting of hydrogen, fluorine, chlorine, bromine, alkyl and alkoxy each having from one to five carbon atoms, trifluoromethyl and trifluoromethoxy; and R is a member selected from the group consisting of naphthyl, phenyl and mono and disubstituted phenyl wherein each substituent is chosen from the group consisting of fluorine, chlorine and bromine, alkyl having up to four carbon atoms, alkoxy and thioalkoxy each having up to three carbon atoms, trifluoromethyl and trifluoromethoxy. These novel compounds are all useful in alleviating the painful effects caused by various inflammatory conditions.

Of especial interest in this connection are such typical member compounds of the invention as 2'-fluoro-2-oxo-2,3-dihydrobenzofuran-3-carboxanilide, 4'-chloro-2-oxo-2,3-dihydrobenzofuran-3-carboxanilide, 2'-methyl-2-oxo-2,3-dihydrobenzofuran-3-carboxanilide, 2'-methoxy-2-oxo-2,3-dihydrobenzofuran-3-carboxanilide, 2-oxo-5-chloro-2,3-dihydrobenzofuran-3-carboxanilide, 4'-chloro-5-chloro-2-oxo-2,3-dihydrobenzofuran-3-carboxanilide, 2-oxo-5,6-dichloro-2,3-dihydrobenzofuran-3-carboxanilide, 2'-fluoro-2-oxo-5,6-dichloro-2,3-dihydrobenzofuran-3-carboxanilide and 4'-chloro-2-oxo-5,6-dichloro-2,3-dihydrobenzofuran-3-carboxanilide. It is to be understood that many of these compounds are potentially tautomeric in nature and may exist in the enolic form with respect to the 2-position of the molecule. All these compounds are extremely potent and possess anti-inflammatory activity to a significantly high degree.

DETAILED DESCRIPTION OF THE INVENTION

In accordance with the process employed for preparing the novel compounds of this invention, an appropriately substituted 2,3-dihydrobenzofuran-2-one of the formula:

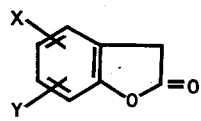

as contacted with an organic isocyanate reagent of the formula RNCO wherein R corresponds to the previously defined organic (aromatic) substituent on the nitrogen atom of the carboxamide moiety of the desired final product. In this way, the corresponding 3-carboxamide (—CONHR) compound is formed where X and Y are both defined as previously indicated. This particular reaction is normally conducted in a basic solvent medium, most desirably employing a reaction-inert polar organic solvent such as tetrahydrofuran, dimethylsulfoxide or dimethylformamide and preferably using a slight excess in moles of a base, like triethylamine, on admixture with the solvent. Many of the aforesaid isocyanate reagents (RNCO) are either known compounds or else they can easily be prepared from more readily available materials by using methods well-known to those skilled in the art. In practice, it is usually preferably to employ at least about a molar equivalent of the isocyanate reagent in the aforesaid reaction of the present invention, with best results often being achieved by using a slight excess of same. Although any temperature below that of reflux may be used in order to effect the reaction, it is normally found most convenient to employ elevated temperature in almost every case so as to shorten the required reaction time, which may range anywhere from several minutes up to about 24 hours depending, of course, upon the particular carboxamide compound actually being prepared. Upon completion of the reaction, the product is easily recovered from the spent reaction mixture by pouring same into an excess of ice-water containing a slight excess of acid, such as hydrochloric acid, whereby the desired carboxamide compound readily precipitate from solution and is subsequently collected by such means as suction filtration and the like.

Another method for preparing the instant compounds of this invention involves reacting a 2,3-dihydrobenzofuran-2-one in the form of an alkali metal or alkaline-earth metal salt with an appropriate 1,1,3-trisubstituted urea of the formula $(R')_2NCONHR$, wherein R' is an aryl group such as phenyl, p-chlorophenyl, p-bromophenyl, p-nitrophenyl, p-acetylaminophenyl, p-tolyl, p-naisyl, α-naphthyl, β-naphthyl, and the like. This reaction is preferably carried out in the presence of a reaction-inert polar organic solvent medium. Typical organic solvents for use in this connection include the N,N-dialkyl lower alkanoamides like dimethylformamide, dimethylacetamide, diethylformamide and diethylacetamide, as well as lower dialkyl sulfoxides such as dimethyl sulfoxide, diethyl sulfoxide and di-n-propyl sulfoxide, etc. It is desirable that the aforesaid solvent for this reaction be present in sufficient amount to dissolve each of the previously mentioned starting materials. In general, the reaction is conducted at a temperature that is in the range of from about 20°C. up to about 150°C. for a period of about one-half to about ten hours. Recovery of the desired product from the reaction mixture is then most conviently accomplished by first diluting the reaction solution with water and then adjusting the pH of the resulting aqueous solution to at least about pH 8.0, followed by subsequent extraction of the basic aqueous solution with any water-immiscible organic solvent in order to remove minor amounts of unreacted or excess starting material that might possibly be present at this stage. Isolation of the desired 2-oxo-2,3-dihydrobenzofuran-3-carboxamide from the basic aqueous layer is then effected by the addition thereto of a dilute aqueous acid solution, wherein the acid is present in such amount that it will cause precipitation of the desired 2-oxobenzofuran carboxamide to occur from the aqueous solution.

In connection with a more detailed consideration of the aforesaid alternate method of synthesis for the compounds of this invention, the relative amounts of reagents employed are such that the molar ratio of the 2,3-dihydrobenzofuran-2-one to the 1,1-diaryl-3-(monosubstituted)urea is desirably in the preferred range of from about 1:1 to about 1:3, although substantially equimolar ratios will still cause equally satisfactory results to be achieved. Nevertheless, an excess of the trisubstituted urea is normally employed in this reaction since this not only serves to cause a shift in the reaction equilibrium to the product side of the equation, but it is also additionally advantageous in that the excess reagent is easily removed after completion of the reaction by means of the solvent extraction step previously referred to. Moreover, it is to be noted that the formation of the carboxamide final products of this invention is still further enhanced by the overall basic character of the general reaction mixture.

The two major type starting materials required for this reaction, viz., the 2,3-dihydrobenzofuran-2-ones and the 1,1-diaryl-3-(monosubstituted)urea, are both readily available to those skilled in the art. For instance, the 2,3-dihydrobenzofuran-2-ones, which are also used as starting materials in the previously described isocyanate method, are, for the most part, well-known in the chemical prior art and/or can easily be synthesized in every case from more readily available materials in accordance with standard organic procedures that are commonly described therein [e.g., see Elderfield et al., is "Heterocyclic Compounds," Vol. 2, John Wiley & Sons, Inc., New York, N.Y. (1951), pp. 3-4, for a brief description of the general reaction involving lactone formation with the corresponding o-hydroxyphenylacetic acid compounds]. The 1,1-diaryl-3-(monosubstituted)urea, on the other hand, are all readily prepared from common organic reagents by employing standard procedures well known in the art, e.g., the desired 1,1,3-trisubstituted urea may be prepared from the corresponding disubstituted carbonyl chloride [(R')$_2$NCOCl] and the appropriate amine (RNH$_2$) in accordance with the general procedure of Reudel, as described in Recueil des Traveux Chimiques des Pays-Bas, Vol. 33, p. 64 (1914).

The chemical bases which are used as reagents in this invention to prepare the pharmaceutically acceptable salts of same are these which form non-toxic salts with the many herein described acidic 2-oxo-2,3-dihydrobenzofuran-3-carboxamides, such as 2'-fluoro-2-oxo-2,3-dihydrobenzofuran-3-carboxanilide, for example. These particular non-toxic base salts are of such a nature that their cations are essentially non-toxic in character over the wide range of dosage administered. Examples of such cations include those of sodium, potassium, calcium and magnesium, etc. These salts can easily be prepared by simply treating the aforementioned 2-oxo-2,3-dihydrobenzofuran-3-carboxamides with an aqueous solution of the desired pharmacologically acceptable base, i.e., those oxides, hydroxides or carbonates which contain pharmacologically acceptable cations, and then evaporating the resulting solution to dryness while under reduced pressure. Alternatively, they may also be prepared by mixing lower alkanolic solutions of the said acidic compounds and the desired alkali metal alkoxide together, and then evaporating said resulting solution in the same manner as before. In either case, stoichiometric amounts of reagents must be employed in order to ensure completeness of reaction, with consequent maximum production of yields of the desired pure product.

As previously indicated, the 2-oxo-2,3-dihydrobenzofuran-3-carboxamide compounds of the present invention are all readily adapted to therapeutic use as anti-inflammatory agents, particularly in view of their ability to reduce the swelling and relieve the pain caused by arthritic and other inflammatory disorders that are normally associated with such basic ailments as rheumatoid arthritis and the like. For instance, 2-oxo-5-chloro-2,3-dihydrobenzofuran-3-carboxanilide, a typical and preferred agent of the present invention, exhibits remarkable activity in the standard carrageenin-induced rat foot edema test [described by C.A. Winter et al., Proc. Soc. Exp. Biol., Vol. 111, p. 544 (1962)], where it was found to cause a strikingly significant inhibition in swelling at the 1.0 mg./kg. dose level. More specifically, 2-oxo-5-chloro-2,3-dihydrobenzofuran-3-carboxanilide has been found to exhibit its aforesaid non-steroidal therapeutic effect in rats when tested orally at levels ranging from 0.33–33 mg./kg., with said compound even retaining its extremely potent anti-inflammatory activity in adrenalectomized animals to a significantly high degree. Additionally, none of these compounds cause any substantial side effects to occur in the subjects to whom they are so administered, i.e., no problems of toxicity or of a harmful pharmacological nature, either gross or microscopic, are encountered when said compounds are administered for the aforestated purposes in the manner described as indicated above.

In accordance with a method of treatment of the present invention, the herein described 2-oxo-2,3-dihydrobenzofuran-3-carboxamide anti-inflammatory agents can be administered to an afflicated subject via either the oral or parenteral routes of administration. In general, these compounds are most desirably administered in doses ranging from about 100 mg. up to about 1000 mg. per day, although variations will still necessarily occur depending upon the weight of the subject being treated. However, a dosage level that is in the range of from about 1.6 mg. to about 16 mg. per kg. of body weight per day is most desirably employed in order to achieve effective results. Nevertheless, it is still to be appreciated that other variations may also occur in this respect, depending upon the species of animal being treated and its individual response to said medicament, as well as on the particular type of pharmaceutical formulation chosen and the time period and interval at which such administration is carried out. In some instances, dosage levels below the lower limit of the aforesaid range may be more than adequate, while in other cases still larger doses may be employed without causing any harmful or deleterious side effects to occur provided that such higher dose levels are first divided into several smaller doses that are to be administered throughout the day.

In connection with the 2-oxo-2,3-dihydrobenzofuran-3-carboxamide compounds of this invention for the treatment of arthritic subjects, it is to be noted that they may be administered either alone or in combination with pharmaceutically acceptable carriers by either of the routes previously indicated, and that such administration can be carried out in both single and multiple dosages. More particularly, the novel compounds of the invention can be administered in a wide variety of different dosage forms. i.e., they may be combined with various pharmaceutically-acceptable inert carriers in the form of tablets, capsules, lozenges, troches, hard candies, powders, sprays, creams, salves, suppositories, jellies, pastes, lotions, ointments, aqueous suspensions, injectable solutions, elixirs, syrups and the like. Such carriers include solid diluents or fillers, sterile aqueous media and various non-toxic organic solvents, etc. Moreover, such oral pharmaceutical compositions can be suitably sweetened and/or flavored by means of various agents of the type commonly employed for just such a purpose. In general, the therapeutically-effective compounds of this invention are present in such dosage forms at concentration levels ranging from about 0.5 percent to about 90 percent by weight of the total composition, i.e., in amounts which are sufficient to provide the desired unit dosage.

For purposes of oral administration, tablets containing various excipients such as sodium citrate, calcium carbonate and dicalcium phosphate may be employed along with various disintegrants such as starch and preferably potato or tapioca starch, alginic acid and certain complex silicates, together with binding agents such as polyvinylpyrrolidone, sucrose, gelatin and acacia. Additionally, lubricating agents such as magnesium stearate, sodium lauryl sulfate and talc are often very useful for tabletting purposes. Solid compositions of a similar type may also be employed as fillers in soft and hard-filled gelatin capsules; preferred materials in the connection would also include lactose or milk sugar as well as high molecular weight polyethylene glycols. When aqueous suspension and/or elixirs are desired for oral administration, the essential active ingredient therein may be combined with various sweetening or flavoring agents, coloring matter or dyes, and, if so desired, emulsifying and/or suspending agents as well, together with such diluents as water, ethanol, propylene glycol, glycerin and various like combinations thereof.

For purposes of parenteral administration, solutions of these particular 2-oxo-2,3-dihydrobenzofuran-3-carboxamides in either sesame or peanut oil or in aqueous propylene glycol may be employed, an well as sterile aqueous solutions of the corresponding water-soluble alkali metal or alkaline-earth metal salts previously enumerated. Such aqueous solutions should be suitably buffered if necessary and the liquid diluent first rendered isotonic with sufficient saline or glucose. These particular solutions are especially suitable for intravenous, intramuscular and subcutaneous injection purposes. Additionally, it is also possible to administer the aforesaid 2-oxobensofuran carboxamide compounds topically when treating inflammatory conditions of the skin and this may be preferably done by way of creams, salves, jellies, pastes, ointments and the like, in accordance with standard pharmaceutical practice.

A general procedure employed for detecting and comparing the anti-inflammatory activity of the compounds of the present invention is, as previously indicated, the standard carrageenin-induced rat foot edema test using the aforementioned technique of C. A. Winter et al. In this test, anti-inflammatory activity is determined as the inhibition of edema formation in the hind paw of male albino rats (weighing 150–190 g.) in response to a subplantar injection of carrageenin. The carrageenin is injected as a 1 percent aqueous suspension (0.05 ml.) 1 hour after oral administration of the drug, which is normally given in the form of an aqueous solution. Edema formation is then assessed three hours after the carrageenin injection by measuring the volume of the injected paw initially as well as at the 3-hour mark. The increase in volume 3 hours after carrageenin injection constitutes the individual response. Compounds are considered active of the response between the drug-treated animals (six rats/group) and the control group (i.e., animals receiving the vehicle alone) is deemed to be significant on comparison with results afforded by standard compounds like acetylsalicylic acid at 100 mg./kg. or phenylbutazone at 33 mg./kg., both by the oral route of administration.

EXAMPLE I

2-Methoxy-5-chlorophenoxyacetic acid was obtained by treating 2-methoxy-5-chlorobenzaldehyde according to the method of Levin et al. [Journal of the American Chemical Society, Vol. 70, p. 1930 (1948)] to give a pure product melting at 127°–129°C. A mixture consisting of 28.5 g. (0.135 mole) of glacial acetic acid, 86 ml. of 48 percent hydrobromic acid and 8.6 ml. of hydriodic acid was then refluxed for a period of 18 hours. After cooling to room temperature, the reaction mixture was diluted with 200 ml. of ice water and treated with a few sodium bisulfite crystals to remove the dark color. It was then extracted with 40 ml. of chloroform, followed by three-100 ml. portions of diethyl ether. The combined ether layers were saved, dried over anhydrous magnesium sulfate and subsequently evaporated to dryness while under reduced pressure. In this manner, a 24 g. (94%) yield of 2-hydroxy-5-chlorophenylacetic acid was obtained as residue in the form of a yellow crystalline solid, m.p. 128°–130°C.

Anal. Calcd. for $C_8H_7ClO_2$: C, 51.49; H, 3.78.

Found: C, 51.24; H, 3.79.

This material was then cyclized by refluxing 600 mg. (3.22 mole) of same in a benzene (10 ml.) solution containing a catalytic amount of p-toluenesulfonic acid, with the water being removed by means of azeotropic distillation. Upon completion of this step (as revealed by thin layer chromatography), water was added to extract the catalyst, followed by washing with 5 ml. of 1N sodium carbonate solution to remove any unreacted starting material. After further washing the reaction mixture with saturated aqueous sodium chloride solution, the benzene layer was dried over anhydrous magnesium sulfate and subsequently evaporated to dryness while under reduced pressure to afford 510 mg. (95 percent) of 5-chloro-2,3-dihydrobenzofuran-2-one, m.p. 127°–129°C.

Anal. Calcd. for $C_8H_5ClO$: C, 57.00; H, 2.99.
Found: C, 57.09; H, 2.99.

EXAMPLE II

A stoichiometrical amount (8.0 g., 0.113 mole) of chlorine gas dissolved in 100 ml. of carbon tetrachloride was added to 17.7 g. (0.113 mole) of freshly distilled 2-methoxy-4-chloro-toluene (i.e., 5-chloro-2-methylanisole, b.p. 106°–111°C./35 mm. Hg.) at ice-cold temperatures (0°–5°C.), and the resulting mixture was then allowed to stir at room temperature (25°C.) for a period of 18 hours. Fractional distillation of the spent mixture than gave 10.7 g. (50percent) of 4,5-dichloro-2-methylanisole, b.p. 144°–145°C./35 mm. Hg.

Anal. Calcd. for $C_8H_8Cl_2O$: C, 50.29; H, 4.22.
Found: C, 49.71; H, 4.24.

A solution consisting of 24.68 g. (0.129 mole) of 4,5-dichloro-2-methyl anisole dissolved in 150 ml. of chloroform was then treated at reflux temperature with 20.6 g. (0.129 mole) of bromine (6.9 ml.) dissolved in 50 ml. of chloroform. The bromine solution was added in a drop-wise manner during the course of a 1.5 -hour period and upon completion of same, refluxing was continued for an additional hour. The reaction mixture was then subjected to further treatment with bromine (6.86 g., 0.043 mole), using the same procedure as before and finally allowed to stand overnight at room temperature (25°C.) for a period of 16–18 hours. Upon evaporation of the solvent, followed by fractional distillation of the resulting oily residue, there were obtained 28.7 g. (83 percent) of 4,5-dichloro-2-bromomethylanisole, b.p. 130°–135°C./0.2 mg. Hg.

A solution consisting of 25.93 g. (0.0975 mole) of the above 4,5-dichloro2-bromomethylanisole dissolved in 50 ml. of ethanol was slowly added (i.e., dropwise) to a solution of 5.9 g. (0.120 mole) of sodium cyanide dissolved in 6 ml. of warm water. The total time required for the addition amounted to 45 minutes. The reaction mixture was then refluxed for a period of 2.5 hours, followed by removal of the solvent under reduced pressure. The residue was subsequently dissolved in methylene chloride and washed with two-100 ml. portions of cold water. After drying over anhydrous magnesium sulfate and evaporating the dried solvent filtrate under reduced pressure, there were obtained 20.5 g. (97 percent) of 4,5-dichloro-2-methoxyphenylacetonitrile as a solid product, m.p. 74°–77°C. Recrystallization from ethanol then raised the melting point to 82°–83°C.

Anal. Calcd. for $C_9H_7Cl_2NO$: C, 50.25; H, 3.25; M, 6.46.

Found: C, 49.86; H, 3.21; H, 6.62.

A mixture of 20.5 g. (0.093 mole) of 4,5-dichloro-2-methoxyphenylacetonitrile in 150 ml. of ethanol and 100 ml. of 3N aqueous potassium hydroxide (0.250 was refluxed for a period of approximately 16 hours. Upon completion of this step, the ethanol was removed by means of evaporation and the basic aqueous residue thereafter washed with three-100 ml. portions of chloroform, followed by acidification of 0°C. with 3M hydrochloric acid. The white precipitate which formed at this point was recoverd by suction filtration and recrystallized from methanol to give 14.52 g. of pure 4,5-dichloro-2-methoxyphenylacetic acid, m.p. 170°–172°C. A second crop of crystals (m.p. 168–171°C.) weighing 1.93 g. was then obtained from the mother liquor. The total yield of material amounted to 75 percent of the theoretical value.

Anal. Calcd. for $C_9H_8Cl_2O_3$: C, 46.19; H, 3.42; Cl, 30.05.

Found: C, 46.26; H, 3.73; Cl, 29.79.

2-Methoxy-4,5-dichlorophenylacetic acid (16.4 g., 0.070 mole), prepared as described above, was then refluxed with 45 ml. of glacial acetic acid, 45 ml. of 48 percent hydrobromic acid and 4.5 ml. of hydriodic acid for a period of 20 hours. On cooling to room temperature and diluting the mixture with 150 ml. of ice water, there was obtained a dark-red solution that was subsequently tested with a few sodium bisulfite crystals, followed by extraction with 10 ml. of chloroform and three-50 ml. portions of diethyl ether. The combined ether/layers were saved, dried over anhydrous sodium sulfate and thereafter evaporated to dryness while under reduced pressure to give a white solid material as residue.

The material obtained above, which was essentially pure 2-hydroxy-4,5-dichlorophenylacetic acid (11.5 g., 0.049 mole), was then refluxed in benzene (100 ml.) with a catalytic amount of p-toluenesulfonic acid for a period of 2.5 hours, with water being removed by means of azeotropic distillation. Upon completion of this step, the mixture was cooled and subsequently treated with 10 ml. of 1N aqueous potassium hydroxide solution, followed by drying over anhydrous magnesium sulfate. After removal of the drying agent by means of filtration and the solvent by means of evaporation under reduced pressure, there were obtained 9.3 g. of crude product which, after recrystallization from isopropanol, gave 7.85 g. of pure 5,6-dichloro-2,3-dihydrobenzofuran-2-one, m.p. 94°–96°C. A second crystalline crop (1.9 g.) was then obtained from the mother liquor. The total yield of final product amounted to 97 percent of the theoretical.

Anal. Calcd. for $C_8H_4Cl_2O_2$: C, 47.33; H, 1.98.
Found: C, 47.24; H, 2.10.

EXAMPLE III

Employing the procedure described in the previous two examples, the following 2,3-dihydrobenzofuran-2-ones are prepared by condensing the corresponding ring-substituted 2-hydroxyphenylacetic acids in the appropriate manner:

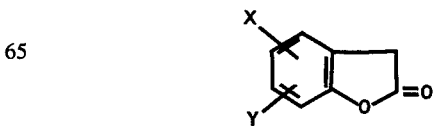

| X | Y |
|---|---|
| H | 7-Cl |
| 4-CH$_3$ | H |
| H | 7-(n-C$_4$H$_9$) |
| 5-OC$_5$H$_{11}$(n) | 6-OC$_5$H$_{11}$(n) |
| 4-(n-C$_5$H$_{11}$) | H |
| 4-Cl | 7-Cl |
| H | 6-CF$_3$ |
| 5-F | 6-F |
| 4-Cl | H |
| 4-Br | H |
| 5-CF$_3$ | 6-CF$_3$ |
| 4-CF$_3$ | H |
| H | 6-OC$_5$H$_{11}$(n) |
| 5-(n-C$_5$H$_{11}$) | 6-(n-C$_5$H$_{11}$) |
| 5-OCF$_3$ | 6-OCF$_3$ |
| 4-OCH$_3$ | H |
| H | 6-F |
| 5-Br | H |
| 5-OC$_2$H$_5$ | 6-OC$_2$H$_5$ |
| 5-Cl | 6-F |
| 4-C$_2$H$_5$ | H |
| 5-C$_2$H$_5$ | 6-C$_2$H$_5$ |
| 4-OCF$_3$ | H |
| H | 6-OCH$_3$ |
| 5-Br | 6-Br |
| 4-F | H |
| 4-(n-C$_4$H$_9$) | H |
| 5-OC$_2$H$_5$ | H |
| H | 7-OCF$_3$ |
| 5-F | H |
| 5-CH$_3$ | 6-CH$_3$ |
| 5-OCH$_3$ | 6-OCH$_3$ |
| 5-Cl | 7-Cl |

EXAMPLE IV

A slurry of 0.44 g. (0.011 mole) of sodium hydride (60.2 percent dispersion in mineral oil) suspended in 5.0 ml. of dry dimethylformamide was slowly stirred at ice-cold temperatures (0°–10°C.), while a solution consisting of 1.34 g. (0.010 mole) of 2,3-dihydrobenzofuran-2-one dissolved in 3.0 ml. of dry dimethylformamide was subsequently added thereto, in a dropwise manner, with continued stirring and cooling being maintained throughout the course of the addition step. At this point, 1.19 g. (0.01 mole) of phenyl isocyanate were next added dropwise to the mixture, followed by foaming and gas evolution until the reaction was essentially complete (as revealed by thin layer chromatography). Upon termination of this step, the resulting mixture was cooled in an ice-water bath and then slowly poured into a mixture of ice water containing 14 ml. of 1N hydrochloric acid. The precipitate which formed at this point was recovered by means of suction filtration and vacuum dried in an oven to afford 2.59 g. of material melting at 145°–155°C. Recrystallization of the latter material from ethanol then gave 0.78 g. (31 percent) of 2-oxo-2,3-dihydrobenzofuran-3-carboxanilide, m.p. 179°–181°C.

Anal. Calcd. for C$_{15}$H$_{11}$NO$_3$: C, 71.14; H, 4.38; N, 5.53.

Found: C, 71.27; H, 4.45; N, 5.60.

EXAMPLE V

The procedure described in Example IV was repeated using 1.33 g. (0.010 mole) of o-tolyl isocyanate in place of 1.19 g. (0.010 mole) of phenyl isocyanate. In this particular case, the corresponding final product thus obtained was 2'-methyl-2-oxo-2,3-dihydrobenzofuran-3-carboxanilide (0.85 g.), m.p. 164°–165°C. after recrystallization from benzene.

Anal. Calcd. for C$_{16}$H$_{13}$NO$_3$: C, 71.90; H, 4.90; N, 5.24.

Found: C, 72.07; H, 4.91; N, 5.24.

EXAMPLE VI

The procedure described in Example IV was repeated using 1.49 g. (0.010 mole) of o-methoxyphenyl isocyanate (i.e., o-anisyl isocyanate) in place of 1.19 g. (0.010 mole) of phenyl isocyanate. In this particular case, the corresponding final product thus obtained was 2'-methoxy-2-oxo-2,3-dihydrobenzofuran-3-carboxanilide (1.05 g.), m.p. 142°–143°C. after recrystallization from ethyl acetate.

Anal. Calcd. for C$_{16}$H$_{13}$NO$_4$: C, 67.84; H, 4.62; N, 4.95.

Found: C, 68.05; H, 4.61; N, 4.95.

EXAMPLE VII

To a well-stirred mixture immersed in an ice bath consisting of 2.68 g. (0.020 mole) of 2,3-dihydrobenzofuran-2-one and 2.22 g. (0.022 mole) of triethylamine in 5.0 ml. of dimethylformamide, there were simply added in a dropwise manner, 3.02 g. (0.022 mole) of o-fluorophenyl isocyanate, with constant agitation being maintained throughout the course of the entire addition step. The resulting reaction mixture was then stirred at room temperature (25°C.) for approximately 1 hour (30–90 minutes), and thereafter poured into cold water and partitioned between 200 ml. of ethyl acetate and 25 ml. of 1N aqueous sodium hydroxide solution. The basic aqueous layer which separated at this point was then saved and next added to an ice-water mixture containing 15 ml. of 6N hydrochloric acid to give a heavy crystalline precipitate. The latter material was subsequently collected by means of suction filtration and air-dried to constant weight to afford a 2.2 g. (46 percent) yield of 2'-fluoro-2-oxo-2,3-dihydrobenzofuran-3-carboxanilide, m.p. 157°–158°C. after one recrystallization from benzene-hexane (4:1 by volume).

Anal. Calcd. for C$_{15}$H$_{10}$FNO$_3$: C, 66.42; H, 3.72; N, 5.17.

Found: C, 66.28; H, 3.70; N, 5.07.

EXAMPLE VIII

The procedure described in Example VII was repeated using 3.38 g. (0.020 mole) of 5-chloro-2,3-dihydrobenzofuran-2-one, 2.62 g. (0.022 mole) of phenyl isocyanate and 2.22 (0.022 mole) of triethylamine in 10 ml. of dry dimethylformamide. In this particular case, the corresponding final product thus obtained was 2-oxo-5-chloro-2,3-dihydrobenzofuran-3-carboxanilide, m.p. 186°–188°C. after recrystallization from benzene.

Anal. Calcd. for C$_{15}$H$_{10}$ClNO$_3$: C, 62.63; H, 3.50; N, 4.87.

Found: C, 62.51; H, 3.52; N, 4.69.

EXAMPLE IX

The procedure described in Example VII was repeated to prepare the following 2-oxo-2,3-dihydrobenzofuran-3-carboxanilides, starting from 2,3-dihydrobenzofuran-2-one and the appropriate phenyl, tolyl or anisyl isocyanate in each case:

3'-methyl-2-oxo-2,3-dihydrobenzofuran-3-carboxanilide, m.p. 158°–159°C.

4′-methyl-2-oxo-2,3-dihydrobenzofuran-3-carboxanilide, m.p. 173°–174°C.
4′-fluoro-2-oxo-2,3-dihydrobenzofuran-3-carboxanilide, m.p. 175°–177°C.
2′-chloro-2-oxo-2,3-dihydrobenzofuran-3-carboxanilide, m.p. 140°–142°C.
3′-chloro-2-oxo-2,3-dihydrobenzofuran-3-carboxanilide, m.p. 183°–184°C.
4′-chloro-2-oxo-2,3-dihydrobenzofuran-3-carboxanilide, m.p. 184°–185°C.
4′-bromo-2-oxo-2,3-dihydrobenzofuran-3-carboxanilide, m.p. 199°–200°C.
4′-methoxy-2-oxo-2,3-dihydrobenzofuran-3-carboxanilide, m.p. 204°–205°C.
4′-ethoxy-2-oxo-2,3-dihydrobenzofuran-3-carboxanilide, m.p. 183°–185°C.

EXAMPLE X

To a well-stirred, ice-cold mixture of 655 mg. (0.0055 mole) of phenyl isocyanate and 0.78 ml. of triethylamine (0.0055 mole) in 5.0 ml. of dimethylformamide, there was added in a dropwise manner 1.0 g. (0.0050 mole) of 5,6-dichloro-2,3-dihydrobenzofuran-2-one that had previously been dissolved in 5.0 ml. of dry dimethylformamide. Constant agitation was maintained throughout the course of the addition, which was complete in about 5 minutes, followed by further stirring of the reaction mixture at 0°C. for an additional period of 5 minutes. Upon completion of this step, the resulting mixture was poured into 20 ml. of ice water and thereafter treated with 10 ml. of 1N aqueous potassium hydroxide and 5 ml. of dry ethyl acetate. The basic aqueous layer which separated at this point was then saved and added to an ice-water mixture containing 5 ml. of concentrated hydrochloric acid, whereupon a cream-colored crystalline precipitate soon formed. The latter material was subsequently collected on a filter funnel and air-dried to constant weight to give 0.568 g. (38 percent) of 2-oxo-5,6-dichloro-2,3-dihydrobenzofuran-3-carboxanilide, m.p. 210°–212°C.

Anal. Calcd. for $C_{15}H_9Cl_2NO_3$: C, 55.92; H, 2.82; N, 4.35.

Found: C, 55.92; H, 2.90; N, 4.44.

EXAMPLE XI

The procedure described in Example X was repeated using 3.38 g. (0.0022 mole) of p-chlorophenyl isocyanate and 2.22 g. (0.0022 mole) of triethylamine in 10 ml. of dimethylformamide, together with 3.38 g. (0.0020 mole) of 5-chloro-2,3-dihydrobenzofuran-2-one also dissolved in 10 ml. of dimethylformamide. In this particular case, the corresponding final product that obtained was 4′-chloro-2-oxo-5-chloro-2,3-dihydrobenzofuran-3-carboxanilide, m.p. 222°–223°C. after recrystallization from isopropanol.

Anal. Calcd. for $C_{15}H_9Cl_2NO_3$: C, 55.92; H, 2.82; N, 4.35.

Found: C, 56.15; H, 3.10; N, 4.32.

EXAMPLE XII

The procedure described in Example X was repeated to prepare the following 2-oxo-2,3-dihydrobenzofuran-3-carboxanilides, starting from either 5-chloro-2,3-dihydrobenzofuran-2-one or 5,6-dichloro-2-oxo-2,3-dihydrobenzofuran-2-one, as the case may be, and the appropriate phenyl, tosyl or anisyl isocyanate reagent in each instance:

2′-methyl-2-oxo-5-chloro-2,3-dihydrobenzofuran-3-carboxanilide, m.p. 196°–198°C.
3′-methyl-2-oxo-5-chloro-2,3-dihydrobenzofuran-3-carboxanilide, m.p. 181°–183°C.
4′-methyl-2-oxo-5-chloro-2,3-dihydrobenzofuran-3-carboxanilide, m.p. 202°–203°C. 2′-chloro-2-oxo-5-chloro-2,3-dihydrobenzofuran-3-carboxanilide, m.p. 147°–148°C.
3′-chloro-2-oxo-5-chloro-2,3-dihydrobenzofuran-3-carboxanilide, m.p. 176°–177°C.
2′-methoxy-2-oxo-5-chloro-2,3-dihydrobenzofuran-3-carboxanilide, m.p. 131°–132°C.
4′-methoxy-2-oxo-5-chloro-2,3-dihydrobenzofuran-3-carboxanilide, m.p. 208°–209°C.
3′-chloro-2-oxo-5,6-dichloro-2,3-dihydrobenzofuran-3-carboxanilide, m.p. 207°–209°C.
4′-chloro-2-oxo-5,6-dichloro-2,3-dihydrobenzofuran-3-carboxanilide, m.p. 216°–218°C.
2′-methoxy-2-oxo-5,6-dichloro-2,3-dihydrobenzofuran-3-carboxanilide, m.p. 150°–152°C.

EXAMPLE XIII

The procedure described in the preceding examples is employed once again to prepare the following 2-oxo-2,3-dihydrobenzofuran-3-carboxamides, starting from the corresponding 2,3-dihydrobenzofuran-2-one and the appropriate organic isocyanate reagent in each case:

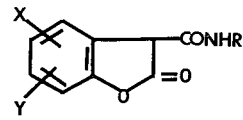

| X | Y | R |
|---|---|---|
| H | H | 2,4-difluorophenyl |
| 5-OC$_2$H$_5$ | 6-OC$_2$H$_5$ | 3-bromophenyl |
| 5-Cl | H | 2-CF$_3$phenyl |
| 5-Cl | 6-F | 2,4-dimethoxyphenyl |
| H | H | 2-ethylphenyl |
| 4-C$_2$H$_5$ | H | phenyl |
| 5-Cl | 6-Cl | α-naphthyl |
| 5-C$_2$H$_5$ | 6-C$_2$H$_5$ | β-naphthyl |
| 4-OCF$_3$ | H | 4-CF$_3$Ophenyl |
| H | 6-OCH$_3$ | 2-chlorophenyl |
| 5-Br | 6-Br | 3-chlorophenyl |
| 4-F | H | 4-chlorophenyl |
| 4-(n-C$_4$H$_9$) | H | 2-methylphenyl |
| 5-OC$_2$H$_5$ | H | 3-methylphenyl |
| H | 7-OCF$_3$ | 4-methylphenyl |
| 4-Cl | H | 2-methoxyphenyl |
| H | H | 2-thioethoxyphenyl |
| 5-F | H | 4-methoxyphenyl |
| 5-CH$_3$ | 6-CH$_3$ | 2,5-dichlorophenyl |
| 5-OCH$_3$ | 6-OCH$_3$ | 3,4-dimethylphenyl |
| H | H | 2,5-dichlorophenyl |
| H | 7-Cl | 4-(n-butyl)phenyl |
| H | H | 3-CF$_3$phenyl |
| 5-Br | H | 3,5-difluorophenyl |
| 4-CH$_3$ | H | 2,4-dimethoxyphenyl |
| H | 7-(n-C$_4$H$_9$) | 2,5-dimethoxyphenyl |
| H | H | 2-ethoxyphenyl |
| 5-OC$_5$H$_{11}$(n) | 6-OC$_5$H$_{11}$(n) | 4-ethoxyphenyl |
| H | H | 3-isopropoxyphenyl |
| 5-F | H | phenyl |
| 4-(n-C$_5$H$_{11}$) | H | α-naphthyl |
| 4-Cl | 7-Cl | β-naphthyl |
| H | 6-CF$_3$ | 2-thiomethoxyphenyl |
| 5-F | 6-F | 4-bromophenyl |
| H | H | 3-fluorophenyl |
| 5-Cl | H | 5-CF$_3$phenyl |
| 5-CF$_3$ | 6-CF$_3$ | 2,3-dichlorophenyl |
| 5-Cl | H | 5-Cl-2-methoxyphenyl |
| 5-Cl | 6-Cl | 3,5-dichlorophenyl |

-Continued

| X | Y | R |
|---|---|---|
| 4-CF₃ | H | 3,5-dimethoxyphenyl |
| H | H | 4-thiopropoxyphenyl |
| H | 7-OC₅H₁₁(n) | 2,6-dimethylphenyl |
| 5-(n-C₅H₁₁) | 6-n-C₅H₁₁) | 2-CH₃O-5-methylphenyl |
| H | H | 3-Cl-4-methylphenyl |
| 5-OCF₃ | 6-OCF₃ | 2,4-dimethylphenyl |
| 4-OCH₃ | H | 2-Cl-5-CF₃phenyl |
| H | 6-F | 3-CF₃Ophenyl |
| 5-Br | H | 2,4-difluorophenyl |
| 5-Cl | 7-Cl | phenyl |
| H | H | 4-(n-butyl)phenyl |
| H | H | 3-methoxyphenyl |
| H | H | 2-CF₃Ophenyl |
| 4-Br | H | 2,5-difluorophenyl |
| 4-Cl | 7-Cl | phenyl |
| H | H | 4-isopropyl |
| H | H | 4-CF₃phenyl |

EXAMPLE XIV

The sodium salt of 2'-fluoro-2-oxo-2,3-dihydrobenzofuran-3-carboxanilide is prepared by dissolving said compound in anhydrous methanol and then adding said solution to another methanolic solution which contains an equivalent amount in moles of sodium methoxide. Upon subsequent evaporation of the solvent therefrom via freezing-drying, there is obtained the desired alkali metal salt in the form of an amorphous solid powder which is freely soluble in water.

In like manner, the potassium and lithium salts are also prepared as are the alkali metal salts of all the other acidic 2-oxo-2,3-dihydrobenzofuran-3-carboxamides of this invention, which were reported previously in the preceding examples.

EXAMPLE XV

The calcium salt of 2'-methyl-2-oxo-2,3-dihydrobenzofuran-3-carboxanilide is prepared by dissolving said compound in water containing an equivalent amount in moles of calcium hydroxide and then freeze-drying the mixture. The corresponding magnesium salt is also prepared in a similar manner, as are all the other alkaline-earth metal salts not only of this particular compound, but also of those acidic 2-oxo-2,3-dihydrobenzofuran-3-carboxamides previously described in the examples immediately preceding Example XIV.

EXAMPLE XVI

A dry solid pharmaceutical composition is prepared by blending the following materials together in the proportions by weight specified below:

| | |
|---|---|
| 2-Oxo-5-chloro-2,3-dihydrobenzofuran-3-carboxanilide | 50 |
| Sodium citrate | 25 |
| Alginic Acid | 10 |
| Polyvinylpyrrolidone | 10 |
| Magnesium stearate | 5 |

After the dried composition is thoroughly blended, tablets are punched from the resulting mixture, each tablet being of such size that it contains 100 mg. of the active ingredient. Other tablet are also prepared in a similar fashion containing 5, 10, 25 and 50 mg. of the active ingredient, respectively, by merely using the appropriate amount of the oxobenzofuran carboxamide compound in each case.

EXAMPLE XVII

A dry solid pharmaceutical composition is prepared by combining the following materials together in the proportions by weight indicated below:

| | |
|---|---|
| 2'-Methyl-2-oxo-2,3-dihydrobenzofuran-3-carboxanilide | 50 |
| Calcium carbonate | 20 |
| Polyethylene glycol, average molecular weight 4000 | 30 |

The dried solid mixture so prepared is then thoroughly agitated so as to obtain a powdered product that is completely uniform in every respect. Soft elastic and hard-filled gelatin capsules containing this pharmaceutical composition are then prepared, employing a sufficient quantity of material in each case so as to provide each capsule with 250 mg. of the active ingredient.

EXAMPLE XVIII

The following 2-oxo-2,3-dihydrobenzofuran-3-carboxanilides were tested for anti-inflammatory activity in rats, using the carrageenin-induced rat foot edema test, and were found to be active orally at the dosage levels indicated below (these actually represent the minimum effective dose):

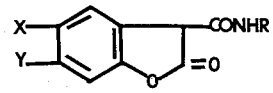

| X | Y | R | Dosage (mg./kg.) |
|---|---|---|---|
| H | H | phenyl | 33 |
| H | H | 2-methylphenyl | 3.3 |
| H | H | 3-methylphenyl | 33 |
| H | H | 4-methylphenyl | 33 |
| H | H | 2-fluorophenyl | 3.3 |
| H | H | 4-fluorophenyl | 33 |
| H | H | 2-chlorophenyl | 33 |
| H | H | 3-chlorophenyl | 33 |
| H | H | 4-chlorophenyl | 10 |
| H | H | 4-bromophenyl | 100 |
| H | H | 2-methoxyphenyl | 10 |
| H | H | 4-methoxyphenyl | 33 |
| H | H | 4-ethoxyphenyl | 33 |
| Cl | H | phenyl | 1.0 |
| Cl | H | 2-methylphenyl | 33 |
| Cl | H | 3-methylphenyl | 100 |
| Cl | H | 4-methylphenyl | 100 |
| Cl | H | 2-chlorophenyl | 33 |
| Cl | H | 3-chlorophenyl | 33 |
| Cl | H | 4-chlorophenyl | 10 |
| Cl | H | 2-methoxyphenyl | 100 |
| Cl | H | 4-methoxyphenyl | 100 |
| Cl | Cl | phenyl | 10 |
| Cl | Cl | 3-chlorophenyl | 33 |
| Cl | Cl | 4-chlorophenyl | 10 |
| Cl | Cl | 2-methoxyphenyl | 33 |
| Cl | Cl | 4-methoxyphenyl | 100 |
| Cl | Cl | 2-fluorophenyl | 10 |

What is claimed is:

1. A method for alleviating inflammation in the treatment of a subject afflicted with inflammatory disorders, which comprises administering to said subject an effective amount of a compound selected from the group consisting of a 2-oxobenzofuran carboxamide of the formula

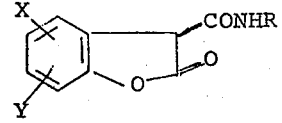

and the base salts thereof with pharmacologically acceptable cations, wherein X and Y are each a member selected from the group consisting of hydrogen, fluorine, chlorine, bromine, alkyl and alkoxy each having from one to five carbon atoms, trifluoromethyl and trifluoromethoxy; and R is a member selected from the group consisting of naphthyl, phenyl and mono and disubstituted phenyl wherein esch substituent is chosen from the group consisting of fluorine, chlorine and bromine, alkyl having up to four carbon atoms, alkoxy and thioalkoxy each having up to three carbon atoms, trifluoromethyl and trifluoromethoxy.

2. The method as claimed in claim 1 wherein the compound administered is 2'-fluoro-2-oxo-2,3-dihydrobenzofuran-3-carboxanilide.

3. The method as claimed in claim 1 wherein the compound administered is 4'-chloro-2-oxo-2,3-dihydrobenzofuran-3-carboxanilide.

4. The method as claimed in claim 1 wherein the compound administered in 2'-methyl-2-oxo-2,3-dihydrobenzofuran-3-carboxanilide.

5. The method as claimed in claim 1 wherein the compound administered in 2'-methoxy-2-oxo-2,3-dihydrobenzofuran 3-carboxanilide.

6. The method as claimed in claim 1 wherein the compound administered in 2-oxo-5-chloro-2,3-dihydrobenzofuran-3-carbonxanilide.

7. The method as claimed in claim 1 wherein the compound administered is 4'-chloro-5-chloro-2-oxo-2,3-dihydrobenzofuran-3-carboxanilide.

8. The method as claimed in claim 1 wherein the compound administered is 2-oxo-5,6-dichloro-2,3-dihydrobenzofuran-3-carboxanilide.

9. The method as claimed in claim 1 wherein the compound administered is 2'-fluoro-2-oxo-5,6-dichloro-2,3-dihydrobenzofuran-3-carboxanilide.

10. The method as claimed in claim 1 wherein the compound administered is 4'-chloro-2-oxo-5,6-dichloro-2,3-dihydrobenzofuran-3-carboxanilide.

* * * * *